May 5, 1959          F. POHL          2,884,833
OPTICAL SYSTEM FOR VIEWING PICTURES
Filed Sept. 13, 1954          2 Sheets-Sheet 1
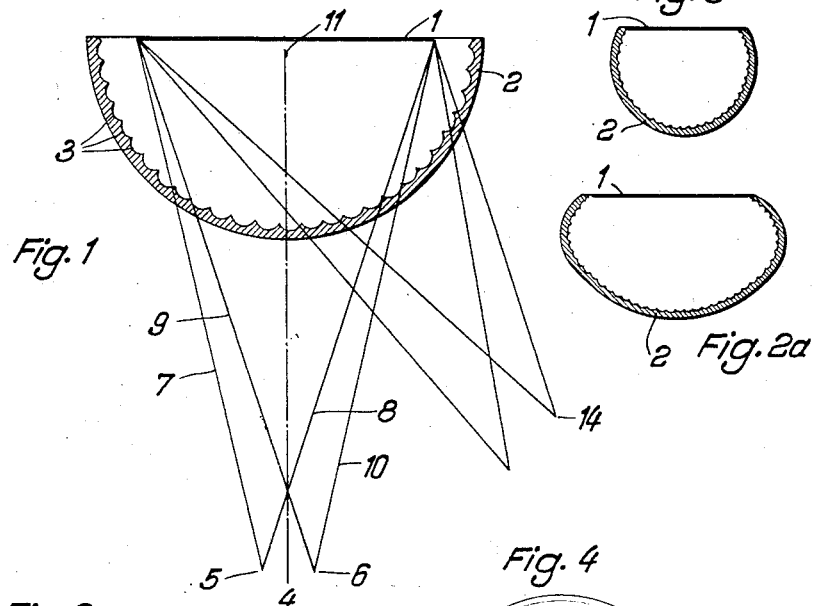
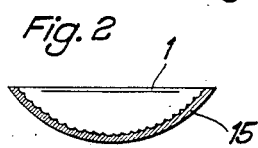
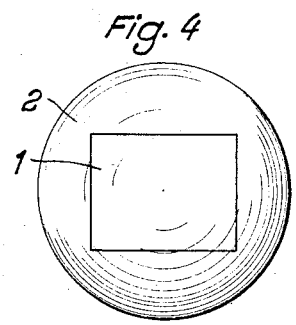
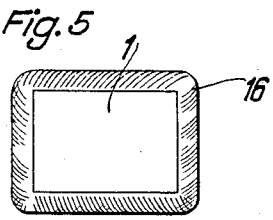
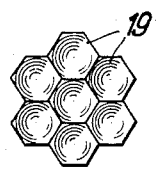
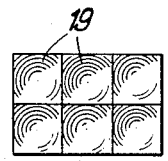

May 5, 1959　　　　　F. POHL　　　　2,884,833
OPTICAL SYSTEM FOR VIEWING PICTURES
Filed Sept. 13, 1954　　　　　　　2 Sheets-Sheet 2

United States Patent Office 2,884,833
Patented May 5, 1959

2,884,833

OPTICAL SYSTEM FOR VIEWING PICTURES

Frederic Pohl, Bad Godesberg, Germany

Application September 13, 1954, Serial No. 455,572

Claims priority, application Germany September 16, 1953

3 Claims. (Cl. 88—28.93)

The invention relates to means and devices for viewing pictures or images, f.i. television images, projected pictures, cinematographic pictures, prints, advertising pictures and so on, with an apparent three dimensional plastic effect.

The usual stereoscopic viewing devices are based on the principle of producing two different stereoscopic images adjacent to one another or upon each other and to view them separately with both eyes. These devices require always complicated optical arrangements and in many cases also eyeglasses for the viewer so that they are not used generally.

It has also been tried, to produce a three dimensional effect by throwing the image to be viewed upon a very large projection screen having a concave curvature towards the viewer. These arrangements, however, can only be used in large movie theaters having sufficient space and are not suitable for home use and for advertising purposes.

It is an object of the present invention to provide a device producing a three dimensional effect and a plastic image with relatively simple means and by using only a single image of the usual form as it exists on the viewing screen of a television receiver or a home movie or in the form of prints or projected still images. It is a further object to obtain the plastic impression by adding to known image producing systems a device which is simple in its construction and which allows viewing the image from various sides and from various distances without disturbing or diminishing the plastic effect.

The main object of the invention is to provide in front of the image screen a transparent lenticular screen having a concave curvature towards the image screen, so that the viewer sees the image through this lenticular screen. With such an arrangement it is possible to produce a surprisingly plastic effect, so that the components of the image located in the foreground seem to lie before those parts and components of the image which form the background of the image. The transparent lenticular screen comprises f.i. a spherically curved shell f.i. a hemispherical shell of glass or artificial resin, which is smooth on one side and provided with a large number of convex impressions or recesses on the other side. The individual lenses or recesses of the raster covering the lenticular screen are preferably so small that they cannot be discerned by the normal eye when viewed from the normal viewing distance.

It is a further object to provide a viewing system containing a lenticular screen either of hemispherical shape or of a curvature having a larger radius so that the lenticular screen is comparatively flat. The lenticular screen may also be formed as a part of a curved body differing from a spherical shaped body. It is also possible to use a screen curved to form a pillow shaped surface having a different radius of curvature in different cross sections of its surface.

The viewing screen on which the image is produced may be plane or curved convexly or concavely towards the viewer. In television receivers the image screen is often curved convexly to the outside when the image is produced on the bottom of the cathode ray tube. It is, however, an object of the present invention to use also an image screen which has a concave curvature on the side directed towards the viewer.

A further object is to provide a viewing screen which is combined with a lens carrying the lenticular screen. The lens may be made of glass or an artificial resin and is covered on one of its surfaces with a multitude of small regularly or irregularly distributed optical elements. The lens is preferably a biconcave collecting lens arranged with its concave side towards the image screen.

A further object is to form the individual lens-shaped recesses of the lenticular screen in such a manner that no unused interstices remain between the individual lens elements. The lenses may have hexagonal bordering lines so that they fit together in the form of a honeycomb, but they may also be limited by a quadrangle, rectangle or a triangle.

With the above and other objects in view my invention comprises certain details of construction and arrangements of parts more fully set forth in the following description which refers to the accompanying drawings forming a part of this specification.

In the drawings:

Fig. 1 shows a cross section through a device according to the invention.

Figs. 2, 2a and 3 show each a cross section through other modifications.

Fig. 4 shows a front view of viewing devices with a television screen arrangement behind the viewing device.

Fig. 5 is a front view of another embodiment.

Fig. 6 is a cross section through a viewing device for television sets.

Fig. 7 is a view of a part of the lenticular screen on an enlarged scale.

Fig. 8 shows another form of the lenticular screen also on a greatly enlarged scale.

Figure 9:
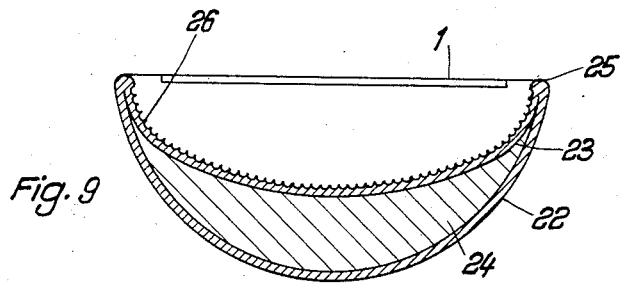
Fig. 9 is a cross section through a viewing arrangement including an aspheric lens.

Fig. 1 shows a plane image screen 1 positioned vertically to the plane of the drawing. A hemispherical shell 2 consisting of a transparent material, f.i. glass, Plexiglas or another transparent artificial resin is arranged in front of the image screen. The shell 2 has a smooth surface on the outer side and a raster of small lenses on its inner side. The raster comprises a large number of very small recesses 3 having a concave curvature towards the image screen. The hemispherical shell is transparent and may have a slightly reducing effect in consequence of the concave lenses. If the image on the screen 1 is viewed from point 4 with the eyes 5 and 6 of the viewer lying in a common horizontal plane then the two eyes will look through different parts of the lenticular screen as indicated by the limiting rays 7 and 8 for the eye 5, and 9, 10 for the eye 6. Without going into the details of the physical side of this effect it may suffice to say that the experiments have shown that a three-dimensional plastic effect is produced by arranging two differently limited portions of the lenticular screen in the ray path of the two eyes of the viewer. This plastic effect is present also for viewers located laterally from a central axis 11 lying perpendicularly to the screen or who are located above or below this axis. A viewer positioned at the point 12 f.i. looks with his two eyes 13 and 14 through different parts of the hemispherical shell 2. The effect is not limited to a certain viewing distance but the viewer may approach the image screen or may move away from it without changing the three dimensional effect.

This device has the advantage over the known devices that the viewing distance can be choosen at will and that the plastic effect does not depend from the size of the image screen. It is not necessary for the viewer to use eye glasses so that the individual properties of the eye need not be considered as the three dimensional effect is produced in equal manner for viewers having different sharpness of vision or resolving power of the eye. The image screen may be viewed from all sides and the viewer is not compelled to hold his head in a certain position but he can incline his head laterally to the left or right side as desired. Only a single image is necessary so that only a single image producing system f.i. only one television tube or one image projector is required. All that is necessary to add is the lenticular screen so that the basic image producing systems are not changed or altered. It is therefore usually possible to add this device to existing systems. The additional lenticular screen does not produce image distortions or image defects so that also in this respect no drawbacks are present. The only condition which should be considered is that the original image is produced with a lens system having sufficient depth of focus.

The form of the lenticular screen 2 may be varied in different ways. The screen 15 represented in Fig. 2 has a larger radius of curvature than that of Fig. 1, so that the screen is relatively flat in front of the image screen. The lenticular screen may also be formed in such a manner that the image screen does not lie in the plane or in front of the plane of the largest diameter of the lenticular screen but behind that plane according to Fig. 2a or 3.

According to Fig. 2a the screen is curved with an approximately elliptic cross section.

The average thickness of the lenticular screen 2 should be the same over its entire surface and the material should be homogeneous and free of streaks.

Fig. 4 shows a rectangular image screen 1 f.i. of a television set with the lenticular screen 2 in front of it. The lenticular screen has a circular basis and the same radius of curvature at all points of the screen.

In order to accommodate the lenticular screen to the rectangular image screen 1 it may be formed according to Fig. 5 in the shape of a cushion. The surface 16 may have a lesser curvature in horizontal cross section than in vertical cross section. The basis of the screen has substantially rectangular shape.

In the arrangement of Fig. 6 the lenticular screen 17 is directly connected to the screen 18 of a cathode ray tube as usually employed in television sets. The space between the screen 18 of the cathode ray tube and the lenticular screen is not evacuated and the latter may serve also as protection against explosion.

Fig. 7 shows the shape of the individual lenses 19 of the lenticular screen. Each lens is limited by an equilateral hexagon so that the lenses fit together without interstices.

The limitation of the lenses may also have the form of a quadrangle (Fig. 8) or of a rectangle.

Fig. 9 shows a lenticular screen combined with a collective lens comprising the two shells 22 and 23 enclosing a space 24 filled with an optically dense fluid f.i. carbon-bisulphide, benzol methylene-iodide or the like. The two shells are cemented together at their edges or connected by fusing or welding in order to produce a fluid tight seal. The lens may have the form of a body with curved symmetry so that its basis 25 is circular. It is, however, possible to shape the basis of the lens in such a manner that it conforms to the rectangular form of the image whereby the lens gets cushion shaped at the edges thereof.

The inner shell 23 of the lens or the outer shell 22 carries the lens raster 26 on its inner or outer side. This raster of lenses may be arranged on the side of the shell 23 contacting the fluid in case the shell has another index of refraction than the fluid 24.

In the arrangement of Fig. 9 the edges of the lens are extended down to the plane of the image screen. This is, however, not necessary in many cases because the image screen is usually viewed only from a certain limited viewing angle.

Figure 10:
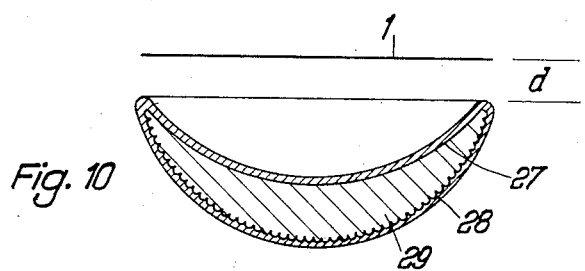
Fig. 10 is a cross section through another form of the lens.

It may therefore be desirable in many cases to arrange the lens at a distance from the image plane as represented in Fig. 10. In this case the basis of the lens has a distance $d$ from the plane of the image screen. The lens includes again two shells 27 and 28 with a material 29 in between. Instead of a liquid a solidifying transparent artificial resin may be filled into the space between the shells. The resin should harden without forming bubbles or streaks so that a clear solid lens is produced. The space between the shells may also be filled by a gaseous optically dense medium.

This lens carries again the lenticular screen as described in connection with Fig. 9.

Figures 11, 12:
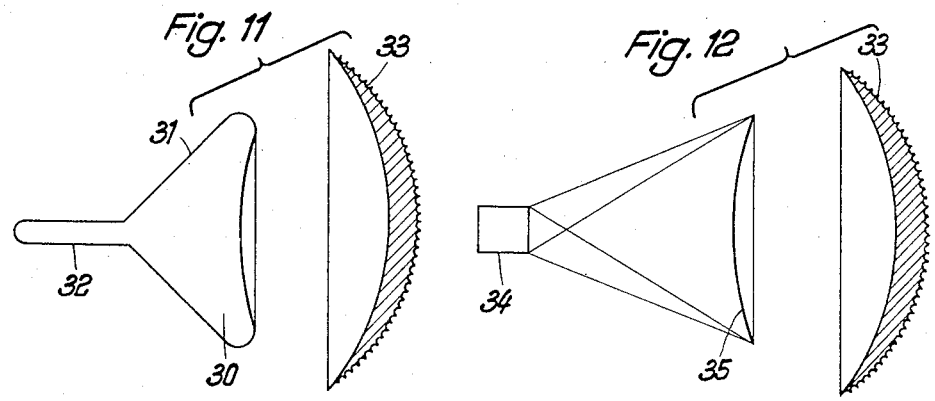
Figs. 11 and 12 are cross sections through still other forms of the viewing system.

Fig. 11 shows an arrangement in which the image screen has a concave curvature towards the viewer. The cathode ray tube 30 comprises the usual bulb portion 31 and neck portion 32. The screen of the tube is, however, curved inwardly so that the image is produced on this concave surface. This image is viewed through a concavo-convex collecting lens 33 covered on its outer side with a lens raster.

A similar arrangement is represented in Fig. 12. In this case the image is produced by an image projector 34 on a screen 35. This screen is translucent and is concave towards the viewer. A lens 33 with a lenticular screen is located between the image screen 35 and the viewer.

The lens may consist entirely of a transparent artificial substance f.i. an artificial resin. It is, however, not necessary that the lens body and the lenticular screen are produced as a single unit. The lens body and the lenticular screen may be manufactured separately and afterwards united or put together. If f.i. a lens of thermoplastic artificial resin is provided with a raster of lenses by pressing the pressure will produce uneven compressions of the material which may detrimentally influence the optical properties of the lens. It may therefore be preferable to produce a smooth lens body separately and a lenticular screen f.i. in the form of a thin foil or by pouring and then to unite the two parts f.i. by using a transparent cement known from the production of optical devices and having an index of refraction corresponding to that of the lens. Another method of production consists in placing the preformed foil containing the lens raster into a mold and to form the lens body in this mold by casting.

The lens and the screen may be made from thermoplastic materials or from materials which harden irreversibly by condensation or polymerisation. The material should absorb the light as little as possible and should be free from bubbles, streaks or similar faults.

The individual lenses are so small that their largest dimension has the order of magnitude of an image element of the television image or of the elementary area of the printed image. The individual lenses may also have a convex shape.

It is not necessary that the inner surface or the outer surface of the screen 2 carries the raster of lenses but the lenses may be arranged within the interior of the transparent material so that the two outer surfaces are smooth and can easily be cleaned.

The individual lens elements of the lenticular screen may also have different radii of curvature in different directions.

The arrangement may be used for viewing black and white images as well as color images with the same effect without requiring additional means when color images are viewed. The simplest arrangement is obtained when the image is produced on the rear side of the image screen 1 as f.i. in television sets. When photographic, still or advertising pictures shall be viewed the image screen 1 may be illuminated from a light source lying in front thereof f.i. within the lenticular screen 2. When projectors are used the projection may also be effected from the rearside of the image screen 1. It is, however, also possible, to project the image through the lenticular screen 2. In this case it is preferable to employ a screen 2 having a surface showing no reflection. This may also be of advantage when the image is projected from the rearside and when at the same time light sources are present in the room on the side of the viewer.

What I claim is:

1. An optical system for viewing pictures comprising an image screen on which the picture to be viewed is produced and a transparent lenticular screen arranged in front of and spaced a distance apart from the image screen on the side of the viewer, said lenticular screen having a concave spherical curvature towards the image screen and being provided on a spherically curved surface thereof with a raster of small lenses across the viewing path through said lenticular screen, said small lenses having polygonal intersections with each other and being symmetrically and regularly arranged on said curved surface so that the axes of said small lenses converge toward said image screen, said small lenses being so small as to be invisible to the naked eye from a normal viewing distance, and the curvature of each of said small lenses and the curvature of said lenticular screen being correlated to the distance between said screens that the eyes of an observer will view an image on said image screen through different curved portions of the lenticular screen for producing a three dimensional effect for the observer.

2. An optical system for viewing pictures according to claim 1 wherein said image screen is substantially spherically curved, and said lenticular screen has a constant average thickness.

3. An optical system for viewing pictures according to claim 1 wherein said lenticular screen is combined with a collecting lens, said small lenses completely cover one of the faces of said screen and are concavely curved toward the outside of said collecting lens, and said collecting lens has a diameter at least equal to the diameter of the image screen and a spherical curvature which is concave toward said image screen.

References Cited in the file of this patent

UNITED STATES PATENTS

| | | |
|---|---|---|
| 1,358,685 | Friedman | Nov. 9, 1920 |
| 1,808,725 | De Francisco | June 2, 1931 |
| 1,930,228 | Draper | Oct. 10, 1933 |
| 2,091,152 | Malpica | Aug. 24, 1937 |
| 2,165,078 | Toulon | July 4, 1939 |
| 2,172,775 | Schmidt-Ott et al. | Sept. 12, 1939 |
| 2,213,077 | Schwartz | Aug. 27, 1940 |
| 2,260,228 | Moller et al. | Oct. 21, 1941 |
| 2,531,399 | Cawein et al. | Nov. 28, 1950 |
| 2,550,350 | Henson | Apr. 24, 1951 |
| 2,552,455 | Pond | May 8, 1951 |
| 2,599,739 | Barnes I | June 10, 1952 |
| 2,706,262 | Barnes II | Apr. 12, 1955 |
| 2,740,954 | Kleefeld | Apr. 3, 1956 |
| 2,746,030 | Schrecongost | May 15, 1956 |

FOREIGN PATENTS

| | | |
|---|---|---|
| 447,896 | Great Britain | May 27, 1936 |